United States Patent
Cherchi et al.

(10) Patent No.: US 11,506,919 B2
(45) Date of Patent: Nov. 22, 2022

(54) INTEGRATED FARADAY ROTATOR

(71) Applicant: Teknologian tutkimuskeskus VTT Oy, Espoo (FI)

(72) Inventors: Matteo Cherchi, Espoo (FI); Alexander Petrov, Hamburg (DE); Dirk Jalas, Hamburg (DE); Mikko Harjanne, Espoo (FI); Timo Aalto, Espoo (FI); Manfred Eich, Hamburg (DE)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 4 days.

(21) Appl. No.: 16/640,736

(22) PCT Filed: Aug. 22, 2018

(86) PCT No.: PCT/FI2018/050595
§ 371 (c)(1),
(2) Date: Feb. 21, 2020

(87) PCT Pub. No.: WO2019/038477
PCT Pub. Date: Feb. 28, 2019

(65) Prior Publication Data
US 2020/0192134 A1 Jun. 18, 2020

Related U.S. Application Data

(60) Provisional application No. 62/548,467, filed on Aug. 22, 2017.

(51) Int. Cl.
*G02F 1/09* (2006.01)
*G02F 1/095* (2006.01)
*G02F 1/01* (2006.01)

(52) U.S. Cl.
CPC .......... *G02F 1/0955* (2013.01); *G02F 1/0136* (2013.01)

(58) Field of Classification Search
CPC ............................ G02F 1/0955; G02F 1/0136
See application file for complete search history.

(56) References Cited

U.S. PATENT DOCUMENTS 4,615,582 A * 10/1986 Lefevre .............. G01R 33/0322
385/4
4,733,938 A * 3/1988 Lefevre ..................... G02F 1/09
324/244

(Continued)

FOREIGN PATENT DOCUMENTS

WO WO2003085430 A1 10/2003

OTHER PUBLICATIONS

S. S. A. Obayya, B. M. A. Rahman, K. T. V. Grattan and H. A. El-Mikati, "Beam propagation modeling of polarization rotation in deeply etched semiconductor bent waveguides," in IEEE Photonics Technology Letters, vol. 13, No. 7, pp. 681-683, Jul. 2001, doi: 10.1109/68.930413. (Year: 2001).*

(Continued)

*Primary Examiner* — Peter Radkowski
(74) *Attorney, Agent, or Firm* — Laine IP Oy (57) ABSTRACT

The invention relates to optical waveguide components, such as Faraday rotators and their manufacture Faraday rotators based on silicon waveguides are provided, where the waveguide has folded or wound sections that are parallel to an externally applied magnetic field.

13 Claims, 5 Drawing Sheets

(56) References Cited

U.S. PATENT DOCUMENTS

| | | | |
|---|---|---|---|
| 2003/0160034 A1* | 8/2003 | Filgas | B23K 26/0648 219/121.68 |
| 2003/0202770 A1 | 10/2003 | Garito et al. | |
| 2003/0206681 A1* | 11/2003 | Polonskiy | H05K 7/1061 385/15 |
| 2005/0275944 A1* | 12/2005 | Wang | G02B 5/18 359/576 |
| 2007/0147725 A1* | 6/2007 | Crespi | G02F 1/0353 385/9 |
| 2013/0039618 A1 | 2/2013 | Kimerling et al. | |
| 2014/0217269 A1* | 8/2014 | Guo | G02B 6/29346 250/227.14 |
| 2015/0260916 A1 | 9/2015 | Cherchi et al. | |
| 2016/0011438 A1* | 1/2016 | Reano | G02B 6/136 385/2 |

OTHER PUBLICATIONS

F. Morichetti, A. Melloni and M. Martinelli, "Modelling of Polarization Rotation in Bent Waveguides," 2006 International Conference on Transparent Optical Networks, 2006, pp. 261-261, doi: 10.1109/ICTON.2006.248464 (Year: 2006).*

W. W. Lui, T. Hirono, K. Yokoyama and Wei-Ping Huang, "Polarization rotation in semiconductor bending waveguides: a coupled-mode theory formulation," in Journal of Lightwave Technology, vol. 16, No. 5, pp. 929-936, May 1998, doi: 10.1109/50.669050. (Year: 1998).*

Matteo Cherchi, Sami Ylinen, Mikko Harjanne, Markku Kapulainen, and Timo Aalto, "Dramatic size reduction of waveguide bends on a micron-scale silicon photonic platform," Opt. Express 21, 17814-17823 (2013) (Year: 2013).*

R.A. Bergh, H.C. Lefevre, and H.J. Shaw , Geometrical Fiber Configuration for Isolators and Magnetometers, In Fiber-Optic Rotation Sensors and Related Technologies, Eds. Ezekial and Arditty, Springer Series in Optical Sciences, 1982. p. 400-405 (Year: 1982).*

Zhang et al: Monolithically-Integrated TE-made ID Silicon-on-Insulator Isolators using Seedlayer-Free Garnet. Scientific Reports, Jul. 19, 2017, vol. 7, No. 1.

Aalto et al: Total internal reflection mirrors with ultra-low losses in 3 μm thick SOI waveguides. SPIES, 2015. vol. 9367, pp. 93670B-1-93670B-9.

Cherchi et al: Low-loss spiral waveguides with ultra-small footprint on a micron scale SOI platform. SPIE, 2014. vol. 8990, pp. 899005-1-899005-7.

Ghosh et al: Optical Isolator for TE Polarized Light Realized by Adhesive Bonding of Ce:YIG on Silicon-on-Insulator Waveguide Circuits. IEEE Photonics Journal, Jun. 2013. vol. 5, No. 3, 6601108.

Hutchings et al: Quasi-Phase-Matched Faraday rotation in semiconductor waveguides with a magnetooptic cladding for monolithically integrated optical isolators. IEEE Photonics Journal, Dec. 2013. vol. 5, No. 6, 6602512.

Jalas et al: Faraday rotation in silicon waveguides. IEEE, GFP, Aug. 23, 2017, pp. 141-142.

Ye: Stress engineering for polarization control in silicon-on-insulator waveguides and its applications in novel passive polarization splitters/filters. (doctoral dissertation) Carleton University, Dec. 2006. ISBN: 978-0-494-23305-4.

* cited by examiner

INTEGRATED FARADAY ROTATOR

FIELD OF THE INVENTION

The invention relates to Faraday rotators and their manufacture. More specifically, the invention relates to Faraday rotators based on magneto/optical materials being affected by a magnetic field. Integrated Faraday rotators are a breakthrough in integrated optics, as they enable the realization of integrated optical isolators and optical circulators.

BACKGROUND OF THE INVENTION

Optical isolators have important applications in telecommunications preventing reflected signals on fiber optic cables from producing unwanted signals. Isolators are also important when lasers are used, because reflected light can cause havoc with the operation of the laser itself. Most importantly, optical isolators and circulators are key building blocks for optical networks.

In the last years there has been considerable effort to introduce non-reciprocal components into integrated photonic circuits. Breaking the reciprocity is needed to implement any optical isolator, which allows light to go through in one direction but severely attenuates reflected light propagating in the opposite direction. Non-reciprocity has been introduced in integrated photonic systems via non-linear effects, via time dependent electro-optical modulation, and most commonly via magneto-optical effects. Although all attempts lead to non-reciprocal devices eventually, a practical implementation of an isolator or circulator is still lacking.

For the non-linear devices the generally low non-linear effect and the need for a high power pump source pose a major problem to on-chip integration. The isolators relying on electro-optical effects require a cumbersome space and time dependent modulation scheme and have so far only been shown to work with insufficient suppression ratios. Materials with strong magneto-optical activity prove to be very difficult to introduce into integrated photonic circuits. Either these materials show a very low effect or too high optical losses or they pose other problems like the crystal lattice mismatch between silicon and the magneto-optical material.

With regard to materials with magneto-optical activity, Michael Faraday observed in 1845 that linearly polarized light propagating through matter parallel to a static magnetic field experiences rotation of the plane of polarization. This rotation of the plane of polarization is called Faraday rotation, and is most commonly achieved by introducing a magneto-optically active material into the system such as an iron garnet. It is however challenging to combine these materials e.g. with integrated silicon waveguides due to the large crystal lattice mismatch between silicon and garnet. Also the losses of these garnets are orders of magnitude higher compared to silicon.

The Faraday rotation of silicon is 15°/cm/T at 1.55 μm which is roughly two orders of magnitude lower than what can be achieved with iron garnets. Assuming a biasing field of 0.5 T, a 6 cm long waveguide is needed to achieve the 45° Faraday rotation necessary for an optical isolator.

It is an object of the present invention to provide an improved optical waveguide component for providing Faraday rotation to a plane of polarization of linearly polarized light propagating in a silicon waveguide component.

SUMMARY OF THE INVENTION

According to one aspect of the invention, an optical waveguide component is provided for providing Faraday rotation to a plane of polarization of linearly polarized light propagating in the waveguide component. The waveguide is made of silicon and has folded or wound sections that are parallel to an externally applied magnetic field. The waveguide may be in some embodiments wound as a spiral on a plane of said component, or it may be wound in a meandering form. Adjacent linear sections carrying counter-propagating light and which are parallel to each other, are combined with bent sections of the waveguide. These bent sections provide a phase-shift between the parallel sections which compensates for the cancellation of Faraday rotation between counter-propagating waveguides.

According to some embodiments, the optical waveguide component is wound as a double spiral having parallel but counter-propagating counter clock-wise and clock-wise branches, whereby adjacent linear sections being parallel to each other are combined with bent sections of said waveguide, said bent sections providing a phase-shift between parallel sections with counter-propagating light, which compensates for the cancellation of Faraday rotation between counter-propagating waveguides.

In some embodiments, the waveguide is being wound as a single spiral having one counter clock-wise or clock-wise branch.

In some embodiments, the waveguide comprise alternate linear sections and bent sections, wherein the linear sections consists of non-birefringent waveguide material and the bent sections of birefringent waveguide material providing a 180° phase-shift between said counter-propagating sections.

In some embodiments, the linearly polarized light consists of the fundamental transverse electric modes and transverse magnetic modes.

In some embodiments, the birefringent bent sections of said waveguide comprise bends with an increasing curvature in the direction of propagation, such as Euler bends.

In some embodiments, the birefringent bent sections of said waveguide comprise bends based on total internal reflection mirrors, in order to achieve minimum footprint.

In some embodiments, the birefringence of an optical waveguide section is controlled by thermal oxidation of the silicon material in said waveguide section, by etching of the silicon material in said waveguide section, by the deposition of a cladding layer (e.g. Si3N4) to induce strain in said waveguide section, and/or by an atomic layer deposition (ALD).

In some embodiments, the birefringence of an optical waveguide section is controlled by the deposition of piezo-electric materials for active control of the strain in said waveguide section.

DETAILED DESCRIPTION OF EMBODIMENTS

Figure 1:
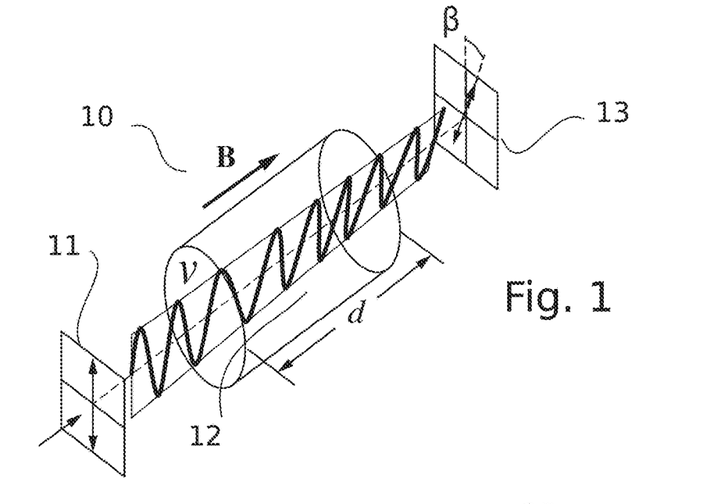
FIG. 1 shows a Faraday rotator schematically.

A polarization dependent isolator, or Faraday isolator 10 as shown in FIG. 1, is made of three main parts, an input polarizer 11 (here polarized vertically), a Faraday rotator 12 and an output polarizer 13, also called analyzer, here polarized at 45°. Light traveling in the forward direction becomes polarized vertically by the input polarizer. The Faraday rotator will rotate the polarization by 45°. The analyzer then enables the light to be transmitted through the isolator. Light traveling in the backward direction becomes polarized at 45° by the analyzer. The Faraday rotator will again rotate the polarization by 45°. This means the light is polarized horizontally (the rotation is sensitive to direction of propagation). Since the polarizer is vertically aligned, the light will be extinguished.

A magnetic field B applied to the Faraday rotator in FIG. 1 causes a rotation in the polarization of the light due to the Faraday effect. The angle of rotation is β and d is the length of the rotator. Specifically for an optical isolator, the values are chosen to give a rotation of 45°.

Figure 2A:
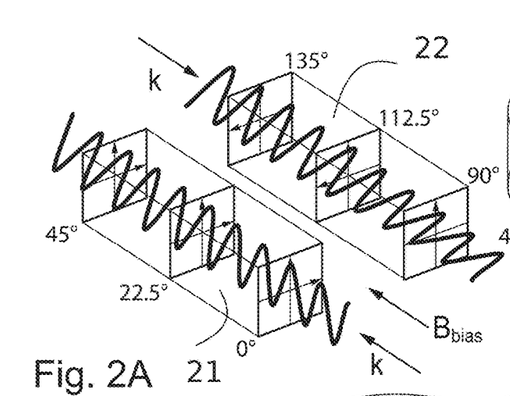
FIGS. 2A-2C show the evolution of the polarization for a folded Faraday rotator.

In FIG. 2 is shown the evolution of the polarization for a folded Faraday rotator. In part A of FIG. 2 is shown a standard Faraday rotator as used for an optical isolator. The left part 21 depicts a wave travelling in forward direction; the right part 22 shows a wave traveling in backward direction. When a wave k is launched into the waveguide 21 with a polarization angle of 0°, the polarization will be rotated clockwise to 45° in this example. For the reverse direction in waveguide 22 the wave vector k and bias field are opposite. Thus the initial polarization of the wave vector in guide 22 is 135°, and the polarization rotation with respect to the wave vector k is counter-clockwise. Thus the polarization is rotated further to an angle of 90°. This is a typical situation for the Faraday isolator, where light reflected in the output port is rotated by 90° in respect to input polarization and thus can be blocked by a polarizer.

Figure 2B:
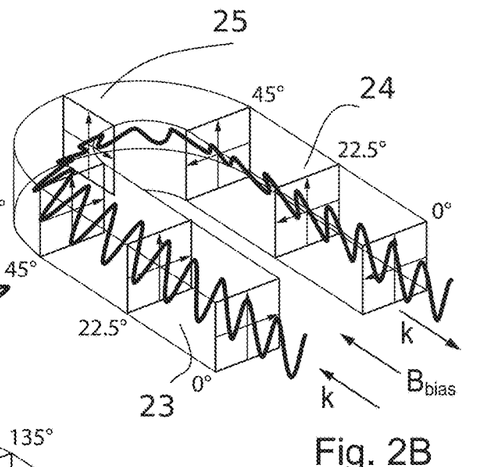
Figure 2C:
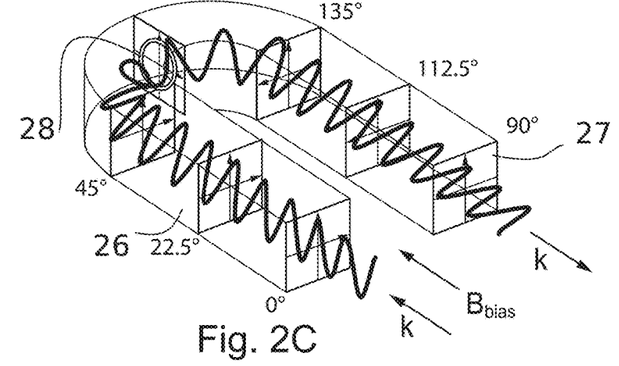

In part B, two Faraday rotators 23, 24 are connected by a bend 25 that preserves the polarization state. The net Faraday rotation is in this case zero. In part C, a similar Faraday rotator assembly is shown as in B, but now the rotators 26, 27 are connected with a birefringent bend 28, that accumulates a 180° phase-shift between the vertical and horizontal polarization. The polarization rotation in the two parts adds up to 90° or 270°, depending on the direction of the 180° phase-shift.

Birefringence is the property of optically non-isotropic transparent materials that the refractive index depends on the polarization direction, i.e. the direction of the electric field. For example, it is observed for crystalline quartz, calcite, sapphire and ruby and in nonlinear crystal materials like $LiNbO_3$, LBO and KTP. Often birefringence results from non-cubic crystal structures. In other cases, originally isotropic materials (e.g. crystals with cubic structure and glasses) can become anisotropic due to the application of mechanical stress, or sometimes by application of a strong electric field; both can break their original symmetry. In optical fibers, birefringence may result from an elliptical shape of the fiber core, from asymmetries of the fiber design or from mechanical stress, e.g. caused by bending. In the specific case of integrated optical waveguides, form-birefringence can be easily achieved by designing suitable waveguide shapes (e.g. a rectangular strip waveguide), so to ensure different effective index for the two orthogonally polarized (quasi TE and quasi TM) eigenmodes. Also in the case of integrated optics, strain and bends can play an important role in mode birefringence, but a key advantage of integrated waveguides is that, once all parameters are known, changing the waveguide shape enable a total control of the birefringence, also in presence of strain and bends.

FIG. 2*b* shows for example what happen to Faraday rotation when the waveguide is designed to have zero birefringence both in the straight and bent sections. The waveguides before and after the bend behave analogous to the straight waveguide with the left arm in FIG. 2*a* behaving like the forward travelling case in FIG. 1*b* and the right arm like the backward travelling case. The one difference is that the bend preserves the polarization state in respect to wave vector and does not mirror it. From this follows that the right arm will reverse the Faraday rotation of the left arm such that the net rotation is zero. To have a non-zero Faraday rotation in a bent waveguide, the bend has to mirror the polarization. This can be done by introducing birefringence into the bend as shown in FIG. 1*c*. Here, the vertical and horizontal polarization are phase shifted with respect to each other by 180°, which makes the case of FIG. 1*c* analogous to FIG. 1*a*.

Typical magneto-optically active materials include CeYIG, $\gamma$-$Fe_2O_3$, orthoferrites and $CoFe_2O_4$ nanoparticles, which have Faraday rotation values (°/cm) of −3300, 25000, 500 and 310, respectively, with a magnetic field of 1 Tesla and a wavelength of $\lambda$=1.55 μm. In contrast, silicon shows a Faraday rotation value of merely 15°/cm, but has very low optical losses and a figure of merit (FoM) which is 6 orders of magnitude larger than the best MO materials. FoM is defined as the ratio of Faraday rotation to loss factor.

Despite this much better ratio silicon is usually not considered as a candidate for a magneto-optical material in optical isolator components for optical networks, because in order to achieve a reasonable Faraday rotation, a propagation length of several centimeters is required.

The magneto-optical activity of silicon can be exploited through either of two effects: the magneto-optical phase shift or Faraday rotation. Upon deciding which effect of the two is the more appropriate, it is important to know that silicon is usually the material with the highest refractive index used in integrated photonic systems and therefore serves as waveguide core material. The high index contrast between silicon in the core and the cladding materials such as silica ensures that the optical wave is to a large part concentrated in the silicon. This is advantageous as it ensures compact dimension and high optical field strengths. However, a magneto-optical phase shift needs asymmetry in the electromagnetic field distribution. Because the field is concentrated in silicon, the field distribution is symmetric and the magneto-optical phase shift is very small.

To the contrary, conventional Faraday rotation does not need such asymmetry and, for this reason, the present invention studies the potential of silicon waveguides as Faraday rotators.

Figure 3:
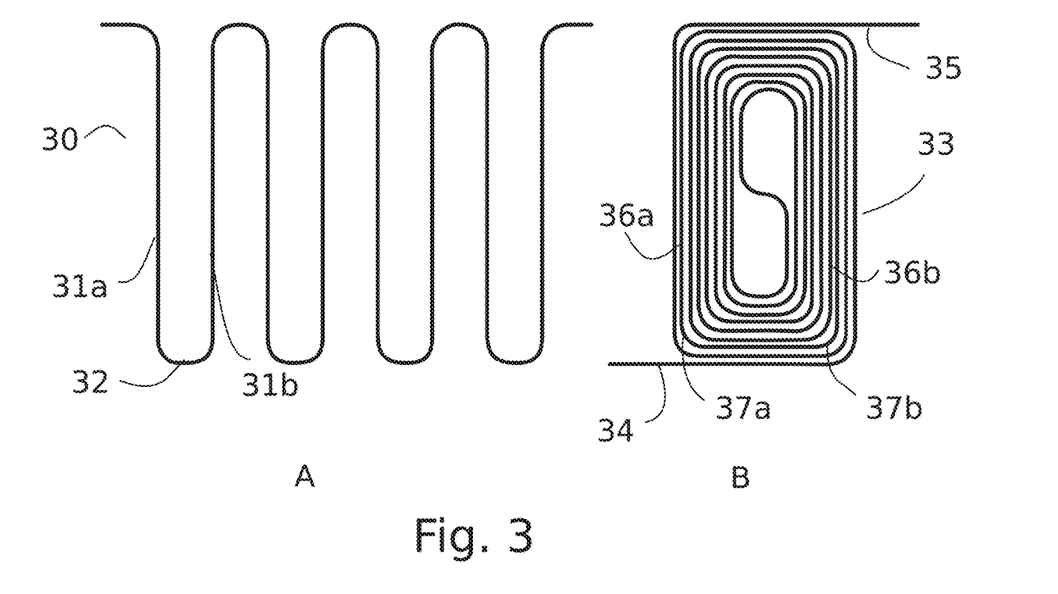
FIG. 3 shows possible ways to wrap up a photonic waveguide.

Referring now to FIG. 3, showing two possible ways to wrap up a photonic waveguide: (A) in meander form, and (B) in spiral form. To use a silicon waveguide for an optical isolator one needs 45° Faraday rotation. If one assumes for simplicity that field is completely confined in the silicon, it would mean that the waveguide has to be 3 cm long if a 1

T magnetic biasing field is applied. Assuming a more realistic 0.25 T our waveguide would be 12 cm long. These and much longer lengths are feasible with silicon waveguides, but the form factor of such long straight waveguide are not be desirable, as they spoil the very concept behind integrated optical circuits. Shortening of the length or footprint of the waveguide, for example by meandering (FIG. 3A) or spiraling (FIG. 3Bb) is thus necessary.

In FIG. 3A, the waveguide 30 is being wound in a meandering form e.g. on a plane of a component, adjacent linear sections 31a, 31b that are parallel to each other, but constitute counter-propagating waveguide sections, are combined with bent sections 32 providing a phase-shift between the parallel sections 31a, 31b.

In FIG. 3B, the waveguide 33 is wound as a double spiral having counter-propagating counter clock-wise and clock-wise branches 34 and 35 respectively. Each opposite linear section 36a, 36b of the same turn is combined with bent sections 37a, 37b, each providing a phase-shift that compensates for the cancellation of Faraday rotation between counter-propagating waves in adjacent parallel linear sections of the waveguide, in the same manner as in FIG. 3A.

Figure 4:
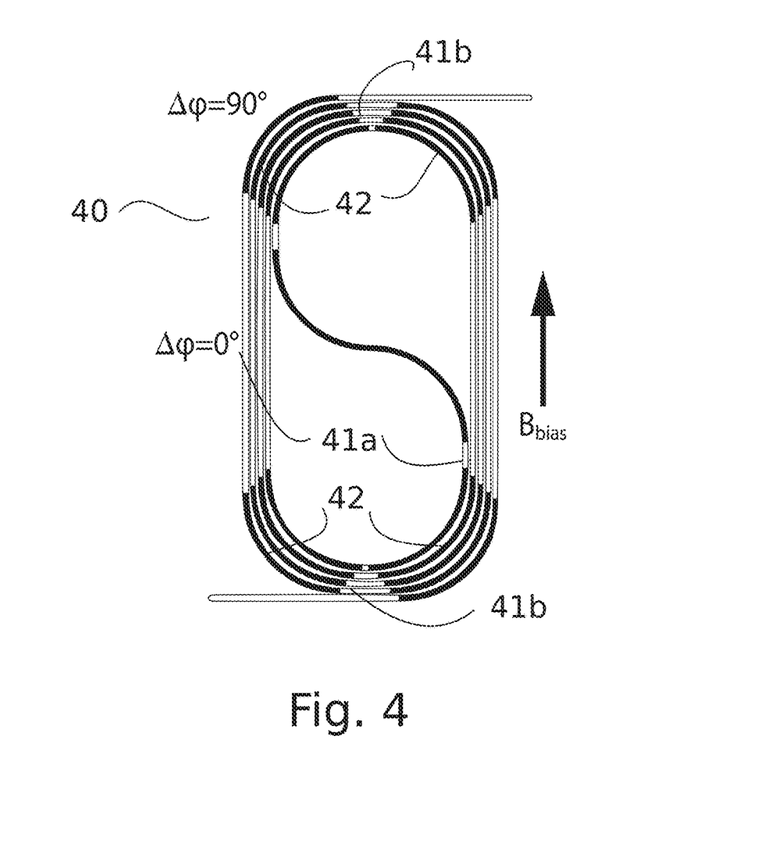
FIG. 4 shows a spiral for Faraday rotation.

In FIG. 4 is shown in more detail a spiral for Faraday rotation, and FIG. 5 shows an experimental setup for a spiral with birefringent bends. A study on an integrated silicon Faraday rotator operating at 1.55 µm wavelength is now discussed, with reference to FIGS. 4 and 5.

The Faraday rotation can be understood as a coupling between the Transverse electric TE mode and the Transverse magnetic TM mode of a waveguide. In a TE mode there is no electric field in the direction of propagation, and in TM modes there is no magnetic field in the direction of propagation. To achieve a rotation of 45°, 50% of the power in one mode needs to be coupled over into the other mode. For a birefringent waveguide the maximum power fraction that can be coupled from one state to the other is given by:

$$\eta = \frac{|\kappa|^2}{|\kappa|^2 + |\underline{\Delta\beta/2}|^2} \quad (1)$$

where $\Delta\beta$ is the mismatch of propagation constants between the TE- and TM-mode and $\kappa$ is the coupling constant between the two modes, which is for strong mode overlap equal to the Faraday rotation given in rad/m. A standard silicon-on-insulator single mode waveguide of 220 nm height and around 500 nm width is for this reason not suitable as a Faraday rotator. It features a relatively strong form birefringence leading to a $\Delta\beta$ of $2.5 \cdot 10^4$ 1/cm. For a biasing field of 0.5 T this results in a coupling efficiency of only $\eta = 3.6 \cdot 10^{-7}$.

Instead, a silicon waveguide with a square 3×3 µm2 cross section may be used. The large area ensures a low birefringence even if cladding and substrate have differing refractive indices, thanks to high confinement of the mode in the silicon core. Further, the fundamental TE- and TM-mode have a large field overlap for this geometry, yielding a maximum possible coupling constant $\kappa$. Care has to be taken that for such a multimode system only the two fundamental modes are excited and the coupling to higher order and thereby unwanted modes is suppressed. This was previously achieved by carefully designing bends and coupling section as well as ensuring a low sidewall roughness, also resulting in low propagation losses in the magnitude order of 0.1 dB/cm. In several centimeters long devices, such loss levels are mandatory to achieve.

However, a 6 cm Faraday rotator might be too long to fit on to a chip. A much more compact footprint of the rotator can be achieved by wrapping the waveguide into a spiral 40 as shown in FIG. 4. As explained above, such an arrangement poses the problem that the Faraday rotation in the sections where the wave propagation direction and magnetic bias are parallel is compensated by the rotation in the sections where the two are counter-propagating, i.e. antiparallel with regard to the direction of propagation of light. This can be compensated by introducing a phase shift of $\Delta\varphi=180°$ between TE- and TM-mode after each turn. This novel design technique ensures that the Faraday rotation further adds up when the propagation direction with respect to the external B-field is reversed.

In FIG. 4, the generally linear sections 41a and 41b (purple) of the spiral 40 feature no or low birefringence, while the bends 42 (green) feature a birefringence which does lead to a phase shift of $\Delta\varphi=90°$ when passing each bend. One U-turn then adds up to $\Delta\varphi=180°$. This total phase shift per U-turn ensures that the Faraday rotation further adds up when the propagation direction with respect to the external magnetic field, indicated with an arrow $B_{bias}$, is reversed.

The birefringence of the bent sections may in some embodiments be based on total internal reflection mirrors, in order to achieve minimum footprint.

Experiment

Figure 5A:
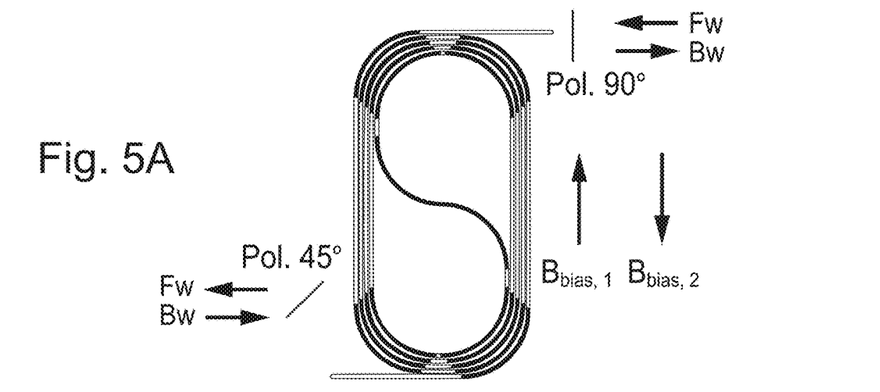
FIGS. 5A-5B show an experimental setup for a spiral with birefringent bends.

To prove the validity of then inventive concept, the inventors designed a spiral with birefringent bends and 3×3 µm2 linear or straight sections. The total length of the linear sections amounts to 6 cm and the footprint of the spiral is 1300×850 µm2. An isolator was built by placing one polarizer oriented 90° at one end facet of the spiral and one oriented 45° at the other end facet (FIG. 5a). A biasing field of 0.2 Tesla was applied. The isolation ratio is the forward transmission divided by the backward transmission. To ensure a defined input state for both directions, single mode fibers leading from the laser source to the device were used. To check the measurement the forward and backward transmission was measured for both orientations of the magnetic biasing field, which should invert the isolation ratio.

Figure 5B:
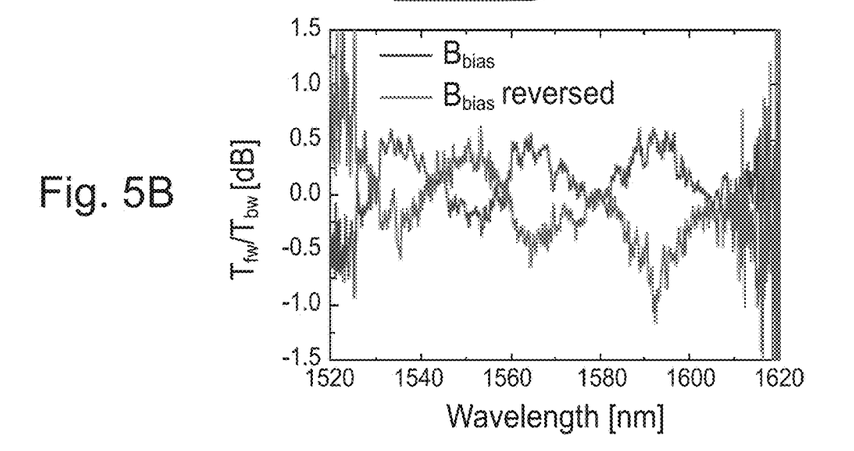

The resulting spectra are shown in FIG. 5b, showing the isolation spectrum for both orientations of the magnetic biasing field. As expected, the isolation ratio is inversed for a reversed magnetic bias. The wavelength dependence of the spectra is due to the dispersion of the birefringence in the bends. Thus, the condition of $\Delta\varphi=90°$ is only met for a limited wavelength range. Unfortunately, the maximum isolation ratio is only 1 dB. The reason for this is the residual birefringence in the linear sections, caused by either strain or slight deviations from the square cross-section. This poses two problems: Firstly, it limits the maximum power fraction that can be coupled from one mode to the other (Eq. 1) and, secondly, the linear sections connecting the 90° bends add an additional phase difference on top of the intended 180° for each bend. The first problem can be mitigated by increasing the magnetic biasing field and thereby increasing $\kappa$. Alternatively, both problems can be resolved by suppressing the unwanted birefringence. If the birefringence is due to shape inaccuracies the aspect ratio of the square cross-section can be altered with a thin conformal coating done with atomic layer deposition. The strain birefringence can thus be reduced by suppressing the birefringence in the linear section of the spiral, e.g. by thermally tuning the device.

Figure 6A:
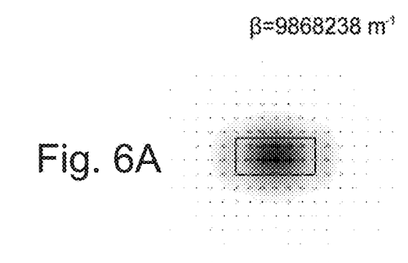
FIGS. 6A-6D show single and multimode waveguide profiles.
Figure 6B:
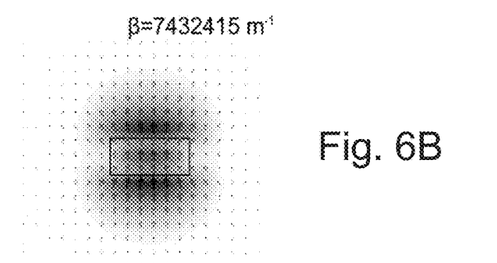

In the following, a practical design using the above mentioned concept will be elaborated upon. An important choice is the waveguide profile. Typically, a silicon waveguide layer is 220 nm high, and the width of the waveguide is adjusted to allow for a single mode for each polarization. However, such waveguides are not well suited for Faraday rotation. In FIGS. 6A and 6B the quasi-TE and the quasi-TM mode of such a waveguide is depicted. The field distribution of both modes is very different which leads to strongly different propagation constants or angular wavenumber $\beta$, given by the equation:

$$\beta = 2\pi/\lambda \qquad (2)$$

Figure 6C:
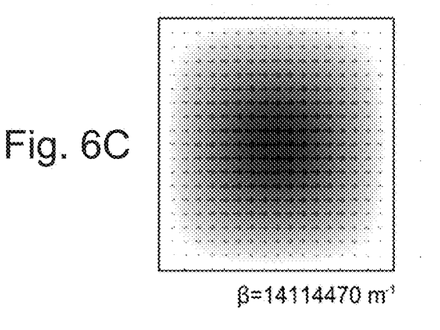
Figure 6D:
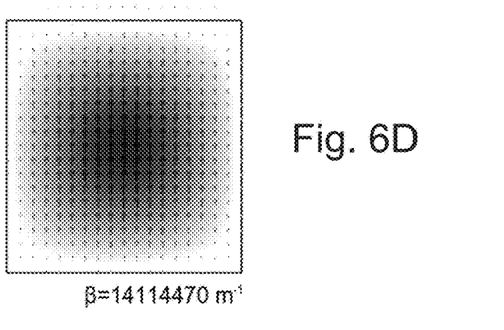

But an efficient Faraday rotation is only possible if both modes have roughly the same propagation constant. Another disadvantage of a single mode waveguide is that a large part of the field is outside the silicon core where it cannot contribute to the polarization rotation as the material is inactive. This calls for a large and symmetric cross-section, such as depicted in FIGS. 6C and 6D. In a 3 µm×3 µm waveguide, the field is confined in the silicon, and the field distributions of the two modes look identical leading to identical propagation constants $\beta$.

However, a large cross-section causes another problem, as the waveguide allows for higher order modes beside the two fundamental modes mentioned above. The number of modes in a waveguide distinguishes multi-mode waveguides from single-mode waveguides.

Higher order modes will spoil the functionality of the Faraday rotator if they are excited. Two sections of the total system are critical in terms of avoiding higher order mode coupling:
- the coupling section from a free space wave to the waveguide, which may be addressed by coupling into a ridge waveguide which only guides the two fundamental modes and then carefully transition into the multimode waveguide with an adiabatic taper which transfers all the light in the fundamental mode only, see e.g. WO2003085430 A1;
- the coupling of modes in the bends, as commonly used sections with a bending radius R pose abrupt changes in the curvature—from zero in the linear section to a curvature of 1/R in the bend section. A remedy to this problem is to make the bending radius so large that the curvature is negligible; however a more elegant and compact way is to gradually increase the curvature of the bend, for example to have the shape of the first section of an Euler spiral, referred to as an Euler bend. See co-pending U.S. patent application Ser. No. 14/436,093 for reference. This gradual change in the curvature significantly reduces coupling to higher order modes. It has been shown that for a waveguide cross-section of 2×4 µm² the effective bending radius can be as small as 17.2 µm and the coupling to higher order modes may still be below 20 dB per bend.

Figures 7A, 7B:
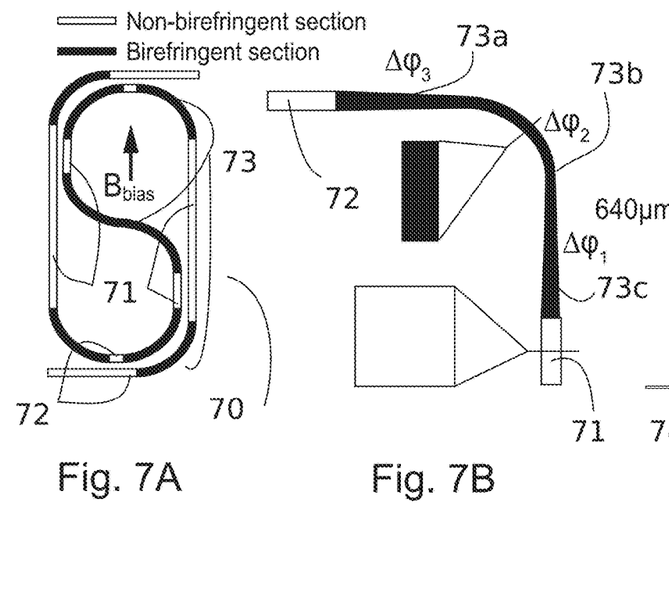
FIGS. 7A-7C show an exemplary implementation of the inventive component.

FIG. 7 depicts an exemplary implementation of the inventive design. A silicon Faraday rotator 70 is shown in FIG. 7A with non-birefringent quadratic linear waveguide sections 71 and 72 depicted (green). The bent birefringent parts 73 are also depicted (red). In FIG. 7B is shown the layout of an exemplary birefringent section 73. The width of the waveguide is narrowed down followed by an Euler bend, and again widened.

The Faraday rotation is generated in those waveguide sections 71 of FIG. 7 that are parallel to the biasing field $B_{bias}$. The needed 180° birefringence of each turn is achieved by two sections 73 each adding 90° phase shift between the TE- and TM-mode. These two sections are connected with a non-birefringent waveguide 72. This waveguide 72 will not contribute to the Faraday rotation as the direction of wave propagation is orthogonal to the biasing field. The birefringent section 73 consists of three parts: a taper 73a from the quadratic waveguide cross-section to one with a large aspect ratio, an Euler bend 73b and a taper 73c back to the quadratic cross-section. The total birefringence $\Delta\varphi_1 + \Delta\varphi_2 + \Delta\varphi_3$ of the three parts 73a-73c in FIG. 7B gives a total polarization rotation of 90°.

Figure 7C:
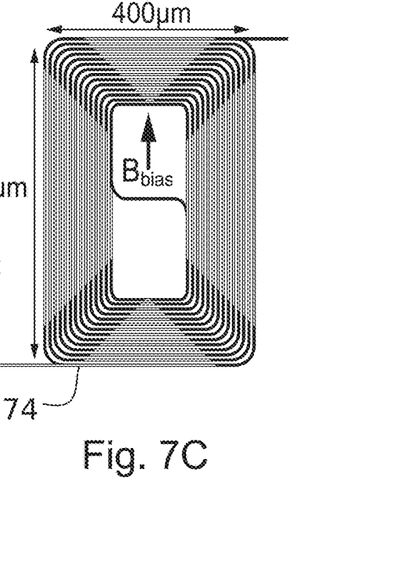

An Euler bend 73b with large aspect ratio is for two reasons beneficial. Firstly, it creates the needed birefringence. Secondly, it allows for a smaller bending radius. The reason for this are that a more narrow waveguide will have less undesired modes that can be coupled and that the narrowing of the waveguide will increase the propagation mismatch between the modes and thus suppress coupling. FIG. 7C shows a possible implementation of an integrated silicon Faraday rotator. With a 1 T biasing field $B_{bias}$, the active waveguide needs to be 3 cm long to achieve the required 45° polarization rotation. The rotating sections have a 3 µm×3 µm cross-section. The bending radius of the Euler bend was chosen to be 20 µm with a 1 µm×3 µm waveguide cross-section. The tapers are 40 µm long. The total device has a footprint of 640×400 µm², which is comparable to devices relying on iron garnets which use ring resonators (typically 290×90 µm²) and Mach-Zhender interferometers (typically 1500×4 µm², 1160×260 µm²).

Thus, despite the more than two orders of magnitude smaller of Faraday rotation that silicon provides in comparison to iron garnets, the exemplary silicon based device is only slightly larger. The reason for this is twofold:
- firstly, the iron garnet based isolators utilize silicon as the high index material for the waveguide core. The strongly magneto-optical active garnet is only used as cladding and, therefore, there is much less overlap of the optical field compared to the multimode silicon waveguide, where nearly all the field is concentrated in the magneto-optical active section
- secondly, the introduced technique of folding the Faraday rotator into a spiral or meander allows for much larger propagation distances per device area.

To ensure the functionality of the device two questions are of importance: Firstly, how much birefringence is allowed in the polarization rotating section and, secondly, how accurately has the birefringence in the bend to be adjusted. The former constraint originates from the fact that a mismatch in propagation constant limits the maximum power that can be coupled from one mode to the other. The maximum efficiency can be calculated by $$\eta = \frac{|\kappa|^2}{|\kappa|^2 + \left|\frac{\Delta\beta}{2}\right|^2}, \qquad (3)$$

where $\Delta\beta$ is the mismatch of propagation constants between the TE- and TM-mode and $\kappa$ is the coupling constant between the two modes, which is for strong mode overlap equal to the Faraday rotation given in rad/m. For an isolator the polarization needs to be rotated by 45°. This means that 50% of the power needs to be coupled from the TE- to the TM-mode or vice versa. Accordingly, $\eta$ needs to be larger than 0.5. This constraint leads to an upper bound for the allowable birefringence of $$|\Delta\beta| < |\kappa|. \qquad (4)$$

For a silicon waveguide and a biasing field between 0.25-1 Tesla, the coupling constant $\kappa$ lies between 6.5 rad/m and 26 rad/m, which is also the upper bound for $\Delta\beta$.

Although the birefringence in the waveguide in FIGS. 6C and 6D is ideally zero, it might still be birefringent due to strain occurring in the manufacturing process or the substrate. If this is the case, the birefringence has to be counteracted by an aspect ratio of waveguide section that slightly deviates from a square, or by post-fabrication tuning described in the following section.

Also the deviation of polarization rotation in bends from 180° can lead to efficiency decrease. The accuracy with that the birefringence in the bend needs to be adjusted can be calculated in a similar fashion. One can define an effective birefringence of one Faraday section and a 180° bend $$\Delta\beta_{eff} = \frac{\pi - 2\,\Delta\beta_{EB}\,L_{EB} - 4\int \Delta\beta_T(l)\,dl}{L_{FR}}. \tag{5}$$

where $\Delta\beta_{EB}$ and $L_{EB}$ are the birefringence and length of the Euler bend. Further, $\Delta\beta_T(l)$ is the length dependent birefringence of the taper integrated over its length and $L_{FR}$ is the length of the Faraday active section. The reasoning behind this effective birefringence is that as long as the Faraday rotation of each section is small, the deviance from 180° birefringence in the turn can be interpreted as a mode mismatch between the TE- and TM-mode in the polarization rotating section. Equation 3 and 4 are also valid for $\Delta\beta_{eff}$, yielding the same upper bounds. The fact that the length of the bending section occurs in the numerator and the length of the polarization rotating section occurs in the denominator means that the smaller the ratio of the former to the latter length is the more relaxed the constraints for $\Delta\beta_{EB}$ and $\Delta\beta_T(l)$ will be. Nonetheless, if one estimates the allowable error in birefringence by assuming that $\Delta\beta_T(l)=\Delta\beta_{EB}$, for the design in FIG. 7C this means that $\Delta\beta_{EB}$ must be adjusted to an accuracy of 25 rad/m. For a 1 μm×3 μm waveguide profile, where the change of birefringence with width is $$\frac{d\Delta\beta}{d\,width} = 188 \cdot 10^9\ 1/m^2$$

at 1.55 μm wavelength, this corresponds to an accuracy in width of 0.13 nm. This may not be feasible with current fabrication techniques, and may call for a post-fabrication trimming.

Post-fabrication trimming may be done by tuning by temperature and trimming by oxidization, for example. The former method utilizes the fact that the refractive index of the silicon waveguide core and the silica cladding slightly change with temperature. For silicon the thermo-optic coefficient $d\eta/dT=1.86 \cdot 10^{-4}$ 1/K, for silica it is $1 \cdot 10^{-5}$ 1/K. The altered refractive index causes a change in birefringence that can be calculated with $$\frac{d\Delta\beta}{dT} = \frac{\partial \Delta\beta}{\partial n_{Si}}\frac{\partial n_{Si}}{\partial T} + \frac{\partial \Delta\beta}{\partial n_{SiO_2}}\frac{\partial n_{SiO_2}}{\partial T}. \tag{6}$$

For the 1 μm×3 μm waveguide profile $$\frac{d\Delta\beta}{dT}$$

is $-5$ $(m\cdot K)^{-1}$. For an adjustable temperature range of $\Delta T=100K$ the birefringence has a tuning range of:

$$\frac{d\Delta\beta}{dT} \cdot \Delta T = -500\ 1/m.$$

This means one can compensate for a change in width of:

$$500\ 1/m \cdot \left(\frac{d\Delta\beta}{d\,width}\right)^{-1} = 2.66\ nm.$$

Figure 8:
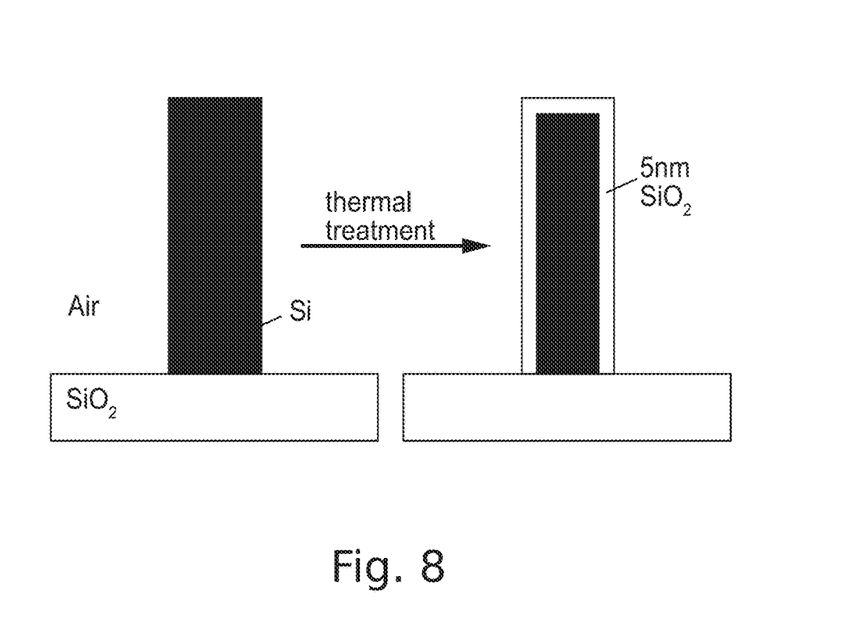
FIG. 8 shows an embodiment of trimming a waveguide according to the present invention.

Larger errors in width can be compensated by oxidizing the outer part of the waveguide. For this approach, one may omit the silica top cladding in the bend and oxidize the surface of the waveguide, see FIG. 8. If the edges of a waveguide's cross section are oxidized, the aspect ratio will change slightly and cause a change in its birefringence. Only the open faces are oxidized and thus the aspect ratio and with that the birefringence changes. For the waveguide in FIG. 8 this yields an oxide thickness dependent change in birefringence of:

$$\frac{d\Delta\beta}{dw_{Oxide}} = 377 \cdot 10^9\ 1/m^2.$$

This means that by oxidizing 50 nm of the outer silicon, one can compensate for an error in width of 100 nm, which is well within the limits of current manufacturing processes.

In conclusion, the birefringence of an inventive optical waveguide section may be controlled by at least one of the following measures, selected from the bulleted list:
- by thermal oxidation of the silicon material in the waveguide section
- by etching of the silicon material in the waveguide section
- by the deposition of a cladding layer (e.g. Si3N4) to induce strain in the waveguide section
- by an atomic layer deposition (ALD)
- by the deposition of piezoelectric materials for active control of the strain in the waveguide section The examples presented above assumed a uniform magnetic field in plane with the waveguides and aligned with the sections where Faraday rotation occurs. This can be achieved in practice by using suitably designed permanent magnets.

Figures 9A, 9B:
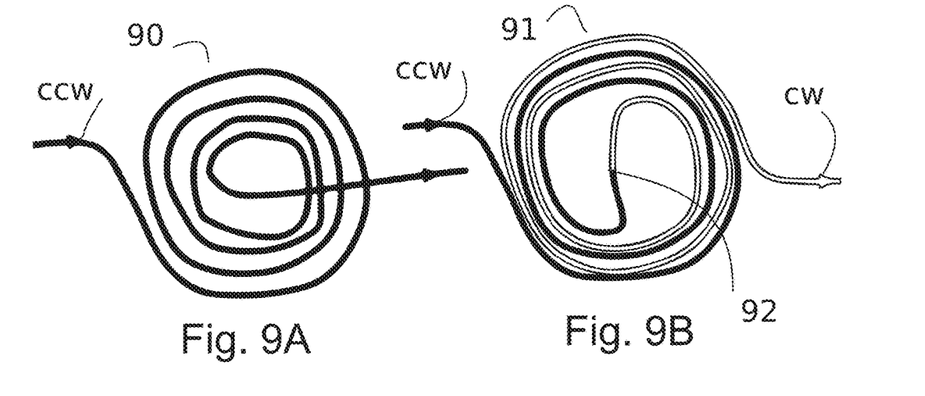
FIGS. 9A and 9B show different spirals that may be used in the present invention.

In FIG. 9C, a spiral (not shown) like the one in FIG. 9A or 9B is placed on a component chip 93 which is provided with a conductor 94 leading current through the center of the spiral. A magnetic field B is thus generated in a closed loop around the center of the spiral, turning it to a Faraday rotator component.

Figure 10:
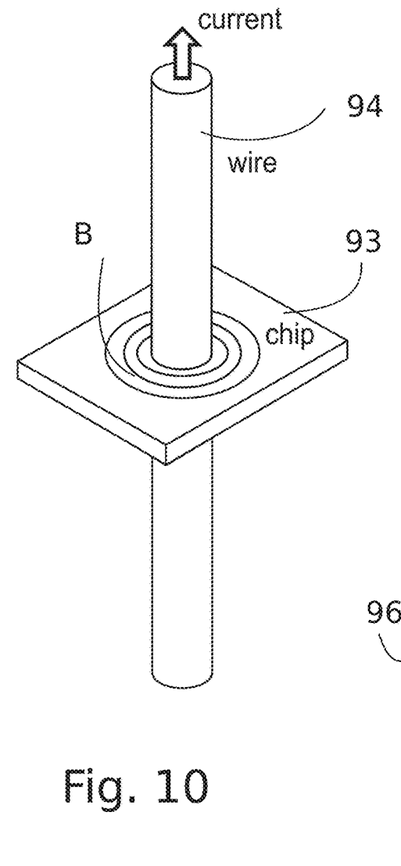
FIG. 10 shows an embodiment for generating magnetic fields that follows the shapes of a spiral waveguide.
Figure 11:
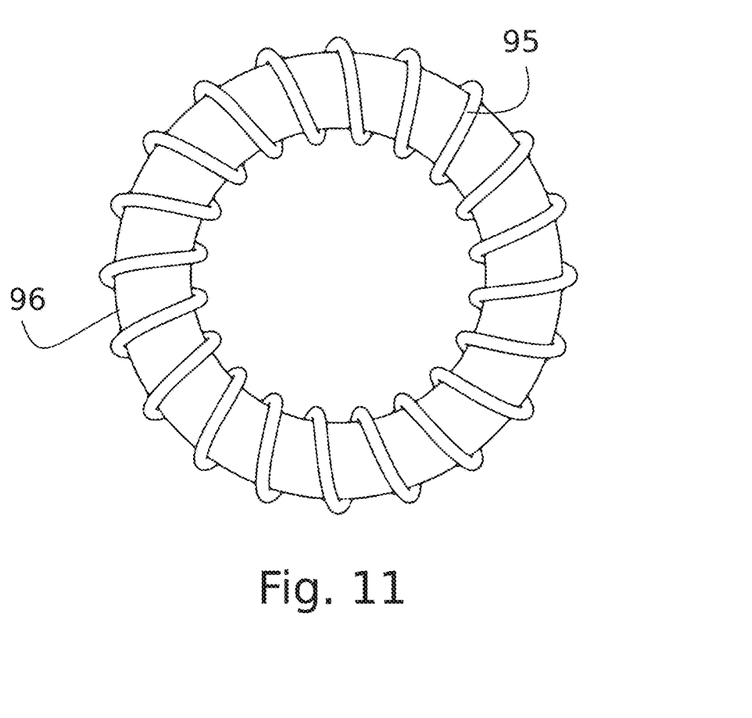
FIG. 11 shows a further embodiment for generating magnetic fields that follows the shapes of a spiral waveguide.

FIG. 10 shows an alternative approach to avoid cancellation of the Faraday rotation, based on making the magnetic field B to bend or follow the waveguide spiral shape on a chip 93. In principle it could be realized with a simple electric wire 94, but as strong magnetic fields in the order of 1 Tesla are needed for this practical Faraday rotation, it would be difficult to achieve with a single wire. A more promising approach is shown in FIG. 11, where a toroidal wire 95 and an iron core 96 extending to the outside of the toroid, to come as close as possible to the waveguides. The spiral waveguide could also be sandwiched between two such electromagnets.

As shown in FIG. 9A, a spiral 90 with only counterclockwise (ccw) turns will provide no counter-propagation, and is therefore effectively a Faraday rotator in itself. In a double-threaded spiral 91 as in FIG. 9B with counterclockwise and clock-wise turns (ccw+cw), the net effect would be zero with regard to Faraday rotation. However, a 180° phase-shift by e.g. a birefringent turn arranged at the vortex 92 of the spiral, would compensate for the cancellation of the Faraday rotation and turn the spiral to a Faraday rotator component.

The invention claimed is:

1. An optical waveguide component for providing Faraday rotation to a plane of polarization of linearly polarized light propagating in said waveguide component, wherein said waveguide is made of silicon and having folded or wound sections that are parallel to an externally applied magnetic field wherein birefringent bent sections of said waveguide comprise bends based on total internal reflection mirrors, in order to achieve minimum footprint.

2. The optical waveguide component according to claim 1, wherein the waveguide is being wound as a spiral on a plane of said component.

3. The optical waveguide component according to claim 1, wherein the waveguide is being wound in a meandering form on a plane of said component, whereby adjacent linear sections being parallel to each other are combined with bent sections of said waveguide, said bent sections providing a phase-shift between parallel sections with counter-propagating light, which compensates for the cancellation of Faraday rotation between counter-propagating waveguides.

4. The optical waveguide component according to claim 2, wherein the waveguide is being wound as a double spiral having counter-propagating counter clock-wise and clockwise branches, whereby opposite linear waveguide sections of the same turn are combined with bent sections of said waveguide, each said bent sections providing a phase-shift that compensates for the cancellation of Faraday rotation between counter-propagating waves in adjacent parallel linear sections of the waveguide.

5. The optical waveguide component according to claim 2, wherein the waveguide is being wound as a single spiral having one counter clock-wise or clock-wise branch.

6. The optical waveguide component according to claim 1, wherein the waveguide comprise alternate linear sections and bent sections, wherein the linear sections consists of non-birefringent waveguide material and the bent sections of birefringent waveguide material providing a 180° phase-shift between said counter-propagating sections.

7. The optical waveguide component according to claim 1, wherein the linearly polarized light consists of the fundamental transverse electric modes and transverse magnetic modes.

8. The optical waveguide component according to claim 1, wherein the birefringence of an optical waveguide section is controlled by thermal oxidation of the silicon material in said waveguide section.

9. The optical waveguide component according to claim 1, wherein the birefringence of an optical waveguide section is controlled by etching of the silicon material in said waveguide section.

10. The optical waveguide component according to claim 1, wherein the birefringence of an optical waveguide section is controlled by the deposition of a cladding layer to induce strain in said waveguide section.

11. The optical waveguide component according to claim 1, wherein the birefringence of an optical waveguide section is controlled by an atomic layer deposition (ALD).

12. The optical waveguide component according to claim 1, wherein the birefringence of an optical waveguide section is controlled by the deposition of piezoelectric materials for active control of the strain in said waveguide section.

13. The optical waveguide component according to claim 10, wherein the cladding layer is comprised of $Si_3N_4$.

* * * * *